(12) United States Patent
Sauvageau

(10) Patent No.: US 12,090,822 B2
(45) Date of Patent: Sep. 17, 2024

(54) UTILITY VEHICLE DOOR TRAVEL CONTROL SYSTEM

(71) Applicant: Seth Sauvageau, Kindred, ND (US)

(72) Inventor: Seth Sauvageau, Kindred, ND (US)

( * ) Notice: Subject to any disclaimer, the term of this patent is extended or adjusted under 35 U.S.C. 154(b) by 0 days.

(21) Appl. No.: 18/438,417

(22) Filed: Feb. 10, 2024

(65) Prior Publication Data

US 2024/0270058 A1 Aug. 15, 2024

Related U.S. Application Data

(60) Provisional application No. 63/444,929, filed on Feb. 11, 2023.

(51) Int. Cl.
*B60J 5/04* (2006.01)

(52) U.S. Cl.
CPC .......... *B60J 5/0468* (2013.01); *B60J 5/0487* (2013.01)

(58) Field of Classification Search
CPC . B60J 5/0468; B60J 5/0487; B60J 5/00; B60J 5/0411; B60J 5/0426; F16C 11/06
See application file for complete search history.

(56) References Cited

U.S. PATENT DOCUMENTS

| | | | |
|---|---|---|---|
| 7,287,753 B1 | 10/2007 | Curtis, Jr. | |
| 8,794,692 B1 | 8/2014 | Burke | |
| 10,632,823 B1* | 4/2020 | Osorio | B60J 5/0416 |
| 10,766,343 B2 | 9/2020 | Sullwold | |
| 10,889,165 B2* | 1/2021 | Osorio | B60J 5/048 |
| 11,718,159 B1* | 8/2023 | Mascadri | E05F 1/1215 |
| | | | 296/146.1 |
| 2003/0052491 A1* | 3/2003 | Ohba | E05C 17/30 |
| | | | 292/263 |
| 2004/0168284 A1* | 9/2004 | Duffy | E05C 17/30 |
| | | | 16/83 |
| 2009/0196682 A1* | 8/2009 | Kuhlman | F16C 11/06 |
| | | | 403/133 |
| 2009/0206856 A1* | 8/2009 | Nam | G01R 31/2877 |
| | | | 324/762.05 |
| 2019/0160922 A1* | 5/2019 | Hagedorn | B60J 5/0477 |
| 2020/0207192 A1* | 7/2020 | Osorio | B62D 25/04 |
| 2020/0386260 A1* | 12/2020 | Marchant, Jr. | F16C 11/0604 |
| 2023/0356573 A1 | 11/2023 | Purcell | |

FOREIGN PATENT DOCUMENTS

| | | | | |
|---|---|---|---|---|
| CN | 101503928 A | * | 8/2009 | ............ E05F 1/1091 |
| CN | 210565731 U | * | 5/2020 | |
| DE | 2754642 C2 | * | 3/1988 | |
| RU | 197101 U1 | * | 3/2020 | |

OTHER PUBLICATIONS https://www.rivetnutusa.com/top-tips-rivet-nut-applications/ Rivet Nut USA a division of Cardinal Components, Inc. Sep. 13, 2019 pp. 1-3. (Year: 2019).*
English Translation of DE 2754642 C2 (Year: 1988).*

* cited by examiner

*Primary Examiner* — Lori Lyjak
(74) *Attorney, Agent, or Firm* — Fargo Patent & Business Law; Thomas Kading

(57) ABSTRACT

A utility vehicle door travel control system includes a door bracket mountable adjacent to an upper surface of a passenger door; a door bracket ball stud mounted to the door bracket; a B-pillar bracket mountable to a B-pillar, a B-pillar ball stud mounted to the B-pillar bracket; and a strut mounted to the door bracket ball stud and the B-pillar ball stud.

17 Claims, 9 Drawing Sheets

UTILITY VEHICLE DOOR TRAVEL CONTROL SYSTEM

CROSS REFERENCE TO RELATED APPLICATION[S]

The present disclosure claims priority to United States Provisional Patent Disclosure Ser. No. 63/444,929, filed Feb. 11, 2023.

BACKGROUND

The present disclosure relates to a door travel control system, and more specifically, a utility vehicle door travel control system for a utility vehicle having a passenger door hinged along an aft surface.

Utility terrain vehicles (UTVs) are popular and effective. Enclosures for such vehicles are typically light in weight yet protect the passenger compartment from inclement weather. Although providing effective protection of the occupants, the swing action of the utility vehicle passenger door is typically not controlled or limited in a way. The utility vehicle passenger door may disadvantageously move freely when pushed by the wind, other forces or gravity depending on the angle of the ground the vehicle is parked on.

SUMMARY

A utility vehicle door travel control system according to one disclosed non-limiting embodiment of the present disclosure includes a door bracket mountable adjacent to an upper surface of a passenger door; a door bracket ball stud mounted to the door bracket; a B-pillar bracket mountable to a B-pillar; a B-pillar ball stud mounted to the B-pillar bracket; and a strut mounted to the door bracket ball stud and the B-pillar ball stud.

A further embodiment of any of the foregoing embodiments of the present disclosure includes the door bracket is mountable via two inner door panel clip apertures.

A further embodiment of any of the foregoing embodiments of the present disclosure includes an adhesive between the door bracket and an inner door panel.

A further embodiment of any of the foregoing embodiments of the present disclosure includes a first spacer and a second spacer adjacent to the door bracket, the first spacer of a thickness different than the second spacer.

A further embodiment of any of the foregoing embodiments of the present disclosure includes that the B-pillar bracket is mountable to the B-pillar adjacent a seat belt mount.

A further embodiment of any of the foregoing embodiments of the present disclosure includes that the passenger door is hinged along an aft surface.

A further embodiment of any of the foregoing embodiments of the present disclosure includes that the door bracket ball stud is directed downward with respect to the upper surface.

A further embodiment of any of the foregoing embodiments of the present disclosure includes that the B-pillar ball stud is directed downward with respect to the upper surface.

A further embodiment of any of the foregoing embodiments of the present disclosure includes that the B-pillar ball stud is lower than the door bracket ball stud with respect to the upper surface.

A utility vehicle door travel control system according to one disclosed non-limiting embodiment of the present disclosure includes a door bracket mountable adjacent to an upper surface of a passenger door hinged along an aft surface; a door bracket ball stud mounted to the door bracket; a B-pillar bracket mountable to a B-pillar; a B-pillar ball stud mounted to the B-pillar bracket; and a strut mounted to the door bracket ball stud and the B-pillar ball stud.

A further embodiment of any of the foregoing embodiments of the present disclosure includes that the door bracket is mountable via two inner door panel clip apertures.

A further embodiment of any of the foregoing embodiments of the present disclosure includes a first spacer and a second spacer adjacent to the door bracket, the first spacer of a thickness different than the second spacer.

A further embodiment of any of the foregoing embodiments of the present disclosure includes an adhesive between the door bracket and the inner door panel.

A further embodiment of any of the foregoing embodiments of the present disclosure includes that the B-pillar ball stud is lower than the door bracket ball stud with respect to the upper surface.

A utility vehicle enclosure according to one disclosed non-limiting embodiment of the present disclosure includes a B-pillar; a passenger door hinged along an aft surface of the passenger door; and a utility vehicle door travel control system mounted between the passenger door and the B-pillar.

A further embodiment of any of the foregoing embodiments of the present disclosure includes that the utility vehicle door travel control system is mounted adjacent to an upper surface of the passenger door.

A further embodiment of any of the foregoing embodiments of the present disclosure includes that the utility vehicle door travel control system is mounted to the B-pillar adjacent to a seat belt mount.

A method to install a utility vehicle door travel control system to a passenger door of a utility vehicle according to one disclosed non-limiting embodiment of the present disclosure includes installing a threaded rivet nut into each of at least two door panel clip apertures; and mounting a door bracket of the utility vehicle door travel control system via the threaded rivet nuts.

A further embodiment of any of the foregoing embodiments of the present disclosure includes installing a B-pillar bracket of the utility vehicle door travel control system adjacent to a seat belt structure; and mounting a pneumatic strut between the door bracket and the B-pillar bracket.

A further embodiment of any of the foregoing embodiments of the present disclosure includes enlarging the at least two door panel clip apertures in an internal metal door frame prior to installing the threaded rivet nuts.

The foregoing features and elements may be combined in various combinations without exclusivity, unless expressly indicated otherwise. These features and elements as well as the operation thereof will become more apparent in light of the following description and the accompanying drawings. It should be appreciated that, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
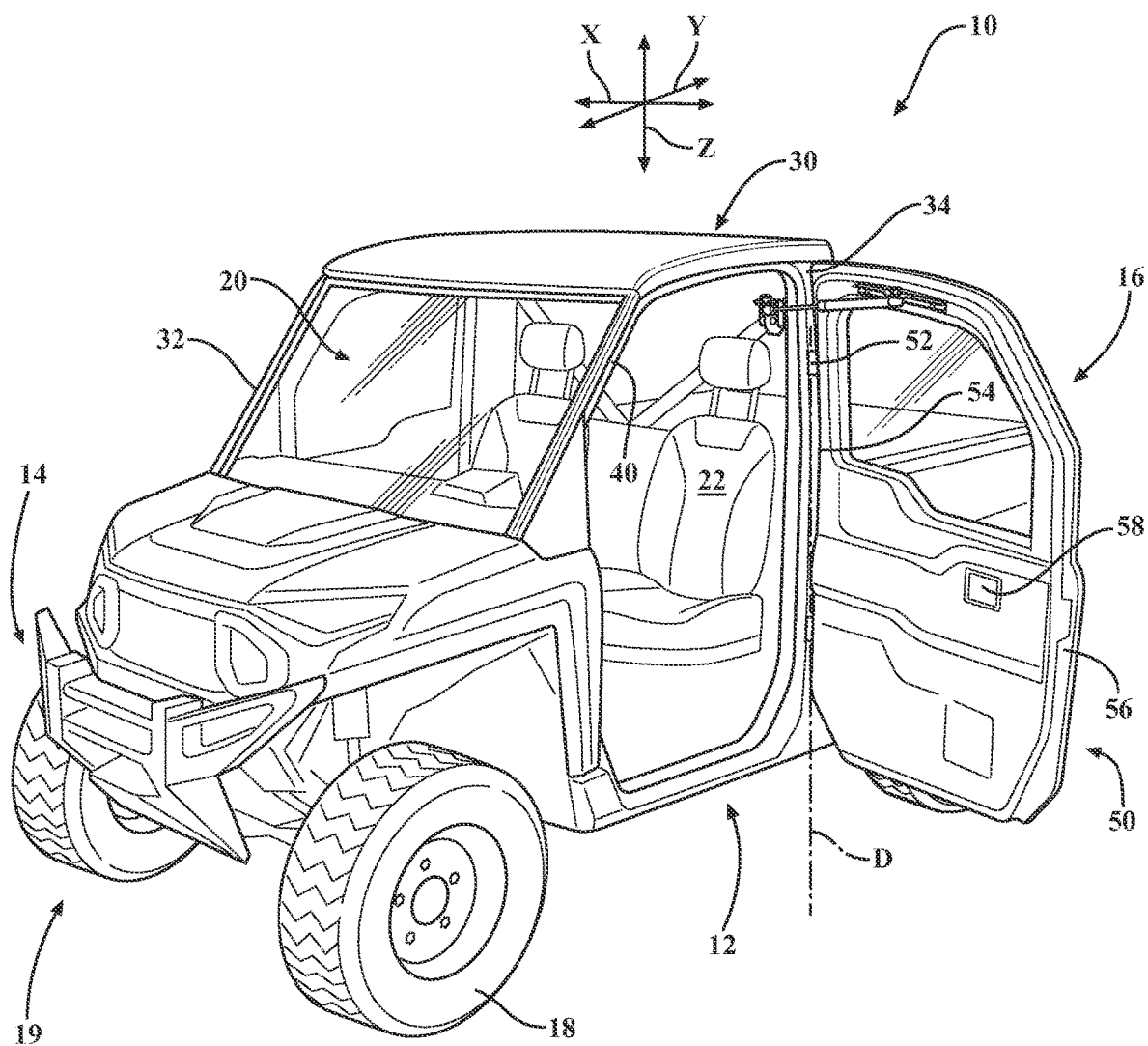
FIG. 1 is a perspective view of an example vehicle including a utility vehicle door travel control system according to one disclosed non-limiting embodiment.

FIG. 1 schematically illustrates a vehicle 10 such as battery, gas, or diesel-powered utility terrain vehicle (UTV). Examples of such vehicles may include Polaris RANGER, golf carts, tractors, all-terrain vehicles, off-road vehicles, military vehicles and other recreational type vehicles with aft hinged doors.

The vehicle 10 includes a chassis 12 with a front end 14 and a rear end 16. A longitudinal axis Y of the vehicle 10 extends along a length of the vehicle between the front end 14 and the rear end 16. A transverse axis X of the vehicle 10 extends perpendicular to the longitudinal axis Y across a width of the vehicle 10. The vertical axis Z is transverse to the Y and X axis. The vehicle 10 includes any suitable number of wheels 18, such as three or four wheels 18.

The chassis 12 defines a passenger compartment 20 including one or more seats 22. With respect to the exemplary vehicle 10 as illustrated, the passenger compartment 20 is covered by an enclosure 30. The enclosure 30 is supported over the passenger compartment 20 by enclosure supports 32, which are also known as A-pillars and supports 34 which are known as B-pillars aft of the A-pillars. The pillars are various structures named alphabetically by order of placement from front to back of the vehicle. The B-pillar is the support structure located between the front and rear doors on a typical vehicle. It corresponds with the A pillar located on either side of the windshield at the front of the car and the C pillar which is arranged on either side of the rear window on a typical vehicle.

The enclosure 30 provides one or more door frames 40 through which persons may enter and exit the passenger compartment 20. In the example illustrated, the enclosure 30 defines two door frames 40 on opposite sides adjacent to a driver side and a passenger side. Mounted to the enclosure 30 at each door frame 40 is a door assembly 50.

Both of the door assemblies 50 are the same (or mirror images or structures of one another), and thus the detailed description of the door assembly 50 provided herein applies to both door assemblies. The door assemblies 50 need not be the same, however, and in some applications only a single door assembly 50 may be included, or more than two (such as four) door assemblies 50 may be included.

Each door assembly 50 is hinged to the enclosure at a hinge structure 52 along a generally vertical axis D that is located along an aft edge 54 of the door 50. That is, the door 50 opens aftward toward the rear end 16 and is latched along a forward edge 56 by a latch assembly 58.

Figure 2:
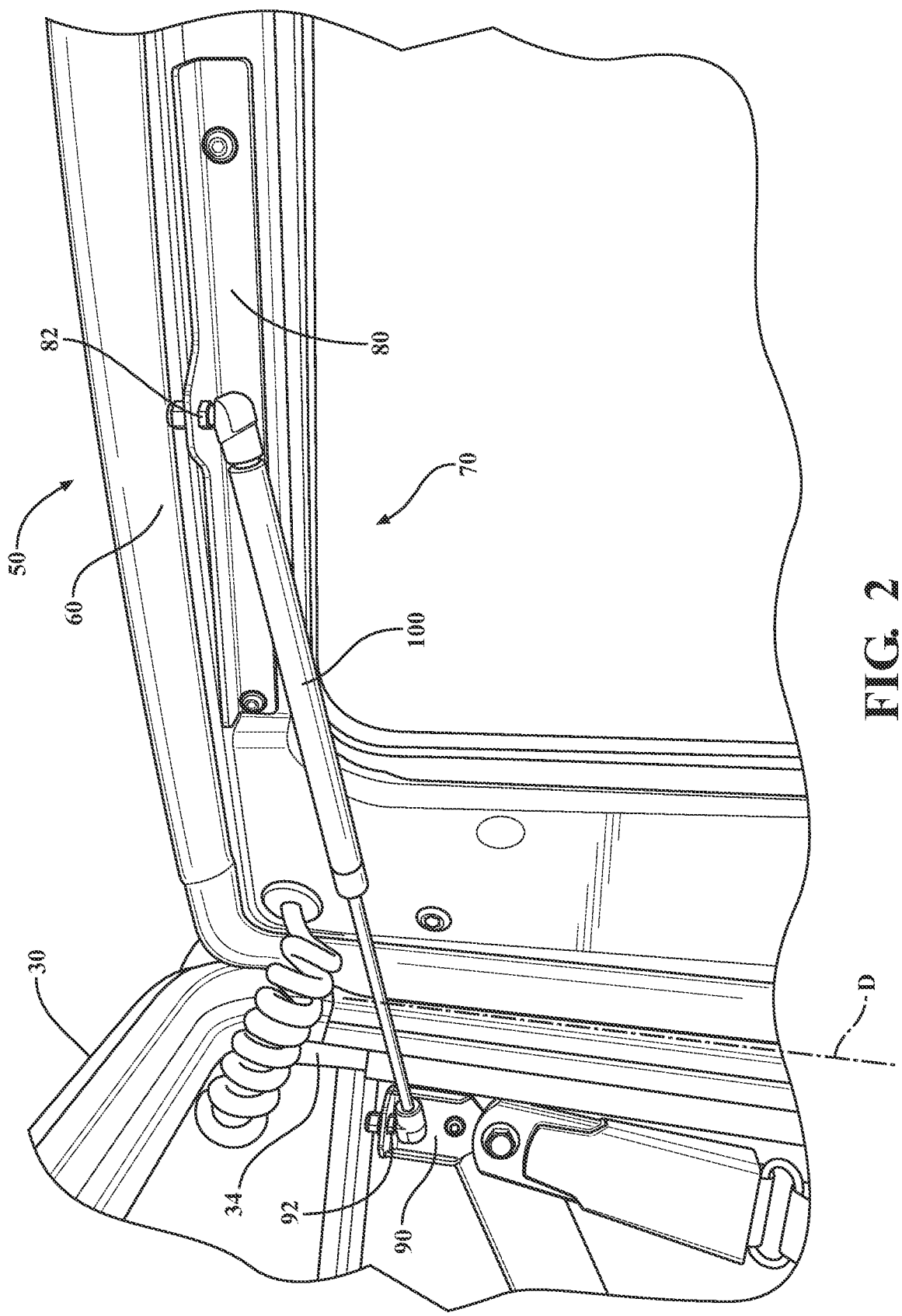
FIG. 2 is a perspective view of the door travel control system in an open position.
Figure 3:
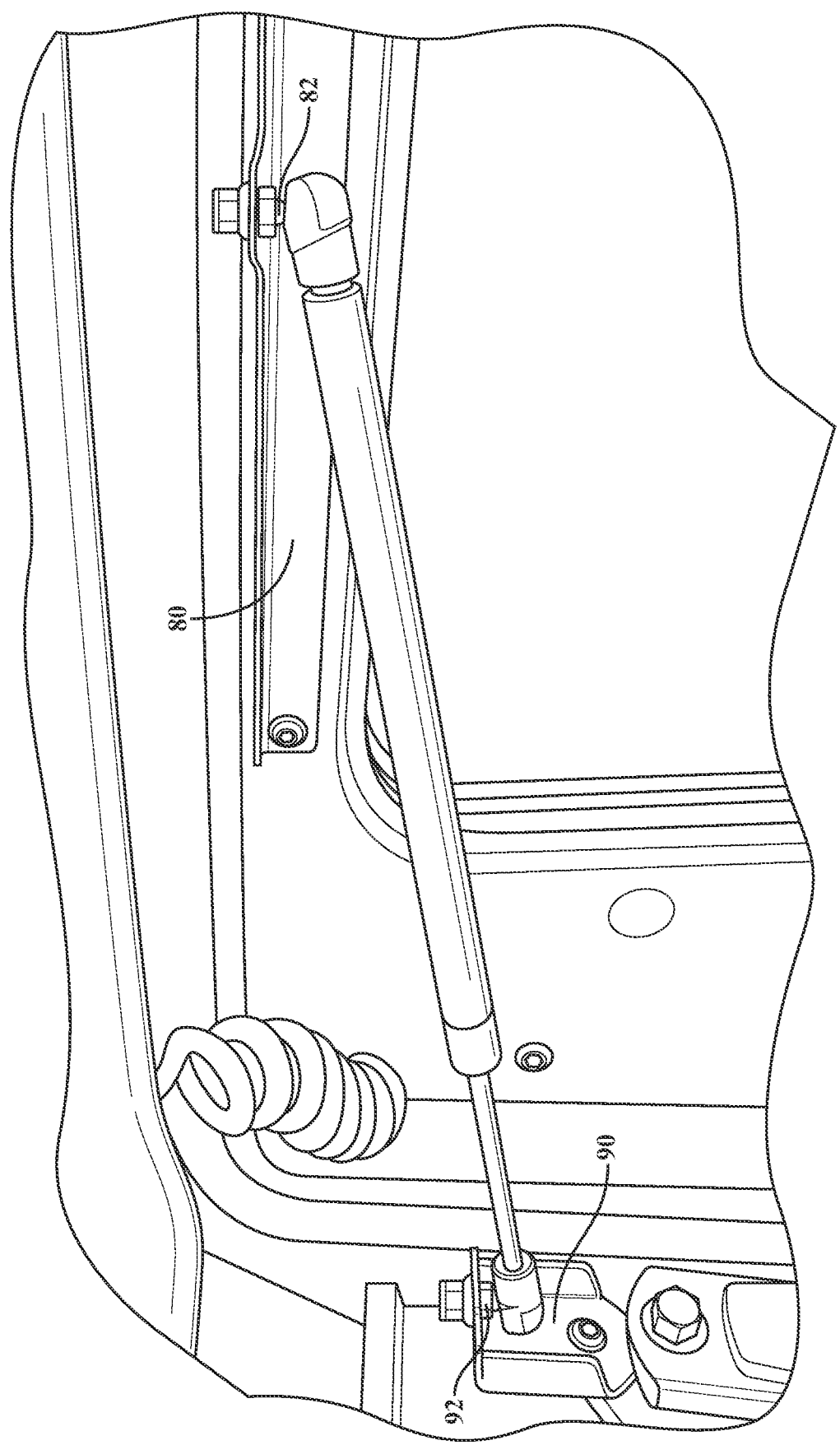
FIG. 3 is a perspective view of the door travel control system in a closed position.

With reference to FIG. 2, a utility vehicle door travel control system 70 is mounted between the enclosure 30 and the door assembly 50 to control movement thereof between an open position (FIG. 2) and a closed position (FIG. 3). The door travel control system 70 is readily installed and assists the operator by slowing the unimpeded opening of the door assembly 50 and holding the door assembly 50 in an open position to facilitate the operator's ingress and egress.

The door travel control system 70 generally includes a door bracket 80 mountable adjacent to an upper surface 60 of the door assembly 50, a door bracket ball stud 82 mounted to the door bracket 80, a B-pillar bracket 90 mountable to the B-pillar structure 34, a B-pillar ball stud 92 mounted to the B-pillar bracket, and a strut 100 mounted to the door bracket ball stud 82 and the B-pillar ball stud 92. Although the door travel control system 70 is illustrated for the driver door in the disclosed embodiment, each passenger door includes a respective door travel control system 70.

Figure 5:
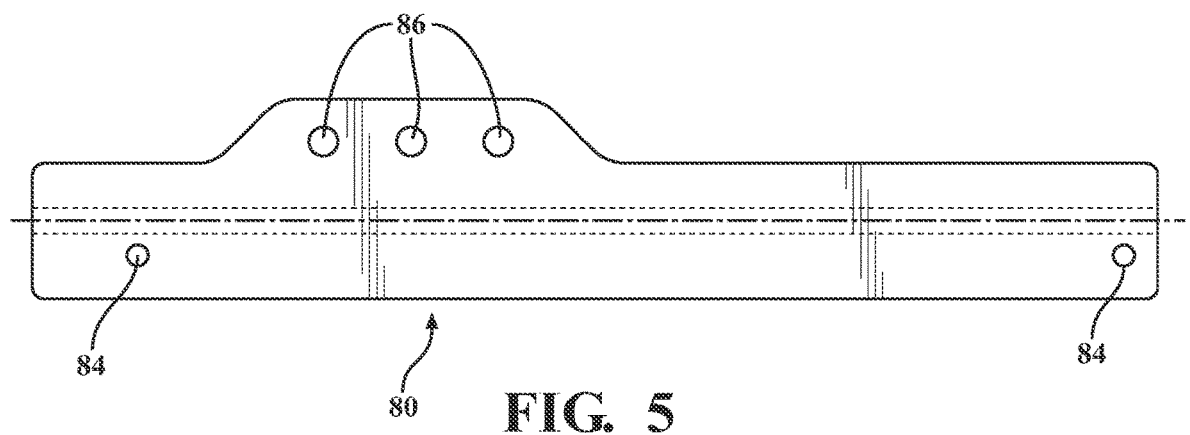
FIG. 5 is a flat view of a door bracket of the door travel control system prior to bending to final shape according to one embodiment.
Figure 6:
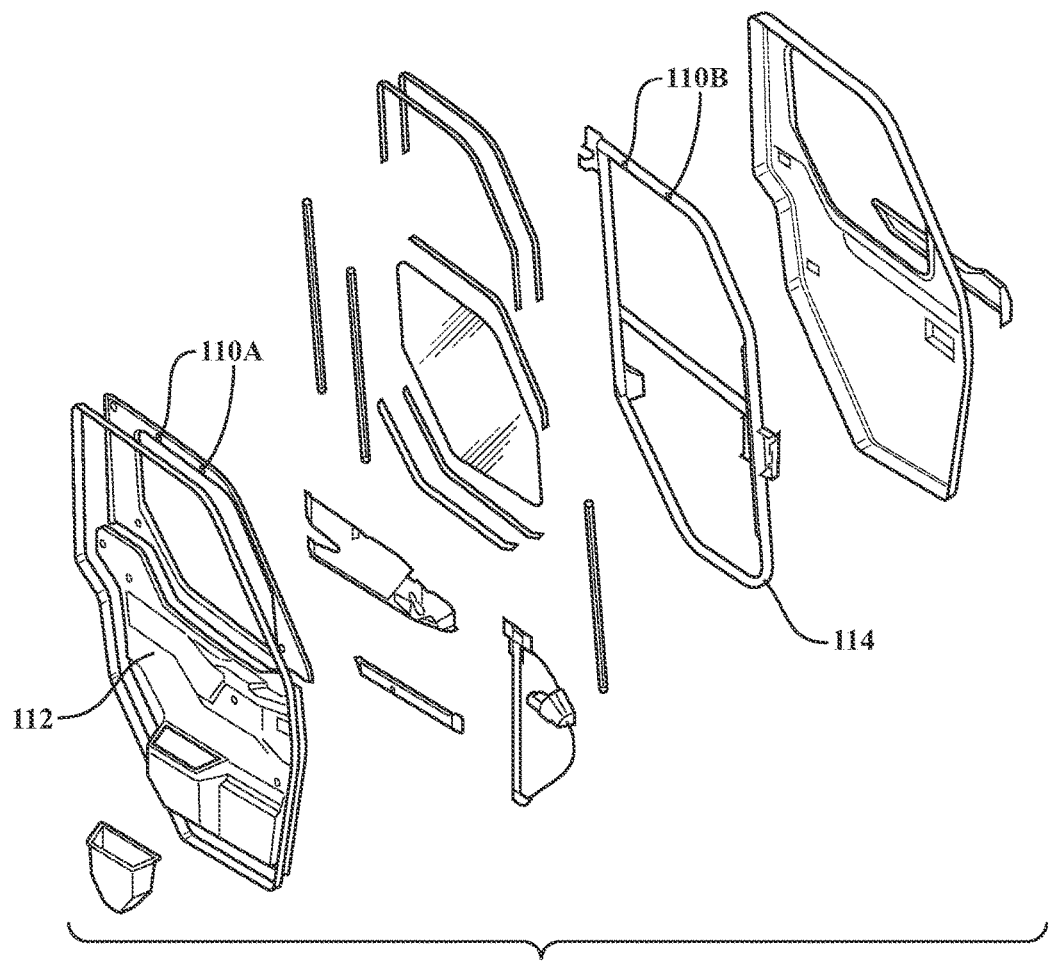
FIG. 6 is an exploded view of an example door to which the utility vehicle door travel control system may be mounted.

The door bracket 80 (also shown in FIGS. 4 and 5) may include one or more mount apertures 84 (two shown) which are aligned with two preexisting inner door panel clip apertures 110A located through an inner door panel 112 and an internal metal door frame 114 (FIG. 6). Typically, there are six body clip locations holding the upper door panel together but only two of the preexisting inner door panel clip apertures 110A are utilized to securely mount the door bracket 80. That is, the multiple of preexisting inner door panel clip apertures 110 are aligned through the respective inner door panel 112 and the internal metal door frame 114 to attach the inner door panel 112 to the internal metal door frame 114 using plastic clips that otherwise extend 5 through the preexisting inner door panel clip apertures 110A to secure the inner door panel 112 to the internal metal door frame 114. The mount apertures 84 are arranged in the door bracket 80 to align with at least two of the preexisting inner door panel clip apertures 110A to secure the door bracket 80 with fasteners that replace the plastic clips.

The door bracket 80 also includes a multiple of ball stud mount apertures 86 to provide a secure anchor point to resist the forces applied by the strut 100 during the motion of opening and closing the door 50. By selecting one of the multiple ball stud mount apertures 86, the angular force required to open and close the door as well as different limits for how far the door is allowed to open may be user selected. Although three ball stud mount apertures 86 are shown, any number may be provided.

In one embodiment, threaded rivet nuts 120A may be installed in the preexisting inner door panel clip apertures 110 of the internal metal door frame 114 to allow removal and reinstallation of the door bracket 80 via threaded fasteners 130. A threaded rivet nut tool with M6 mandrel may be used for installation of the threaded rivet nuts 120A.

Figure 4:
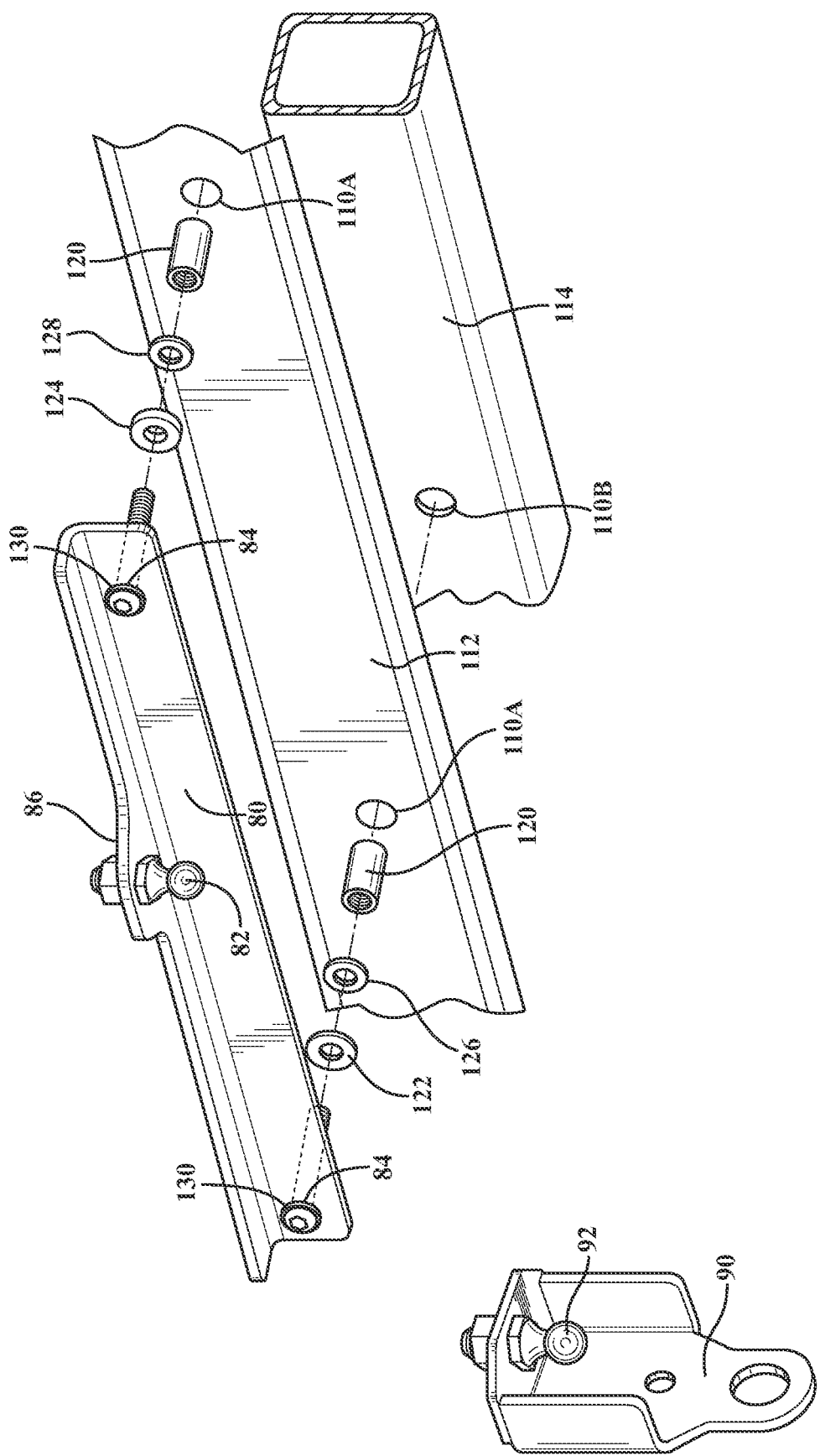
FIG. 4 is an exploded view of the door travel control system in a closed position.

The preexisting inner door panel clip apertures 110A located within the inner door panel 112 may be modified to increase their diameter to receive spacers 126, 128 that may at least partially support spacers 122, 124 (FIG. 4). The preexisting inner door panel clip apertures 110B located within the internal metal door frame 114 may be modified to increase their diameter to receive threaded rivet nuts 120. The preexisting inner door panel clip apertures 110A in the respective inner door panel 112 may at least partially receive the spacers 126, 128. That is, rather than receiving the door clip, the enlarged preexisting inner door panel clip apertures 110A, 110B are enlarged and utilized to mount the bracket 80. In this embodiment, no new apertures need be drilled, only enlarged, which readily facilitates a simple and convenient installation.

Figure 7:
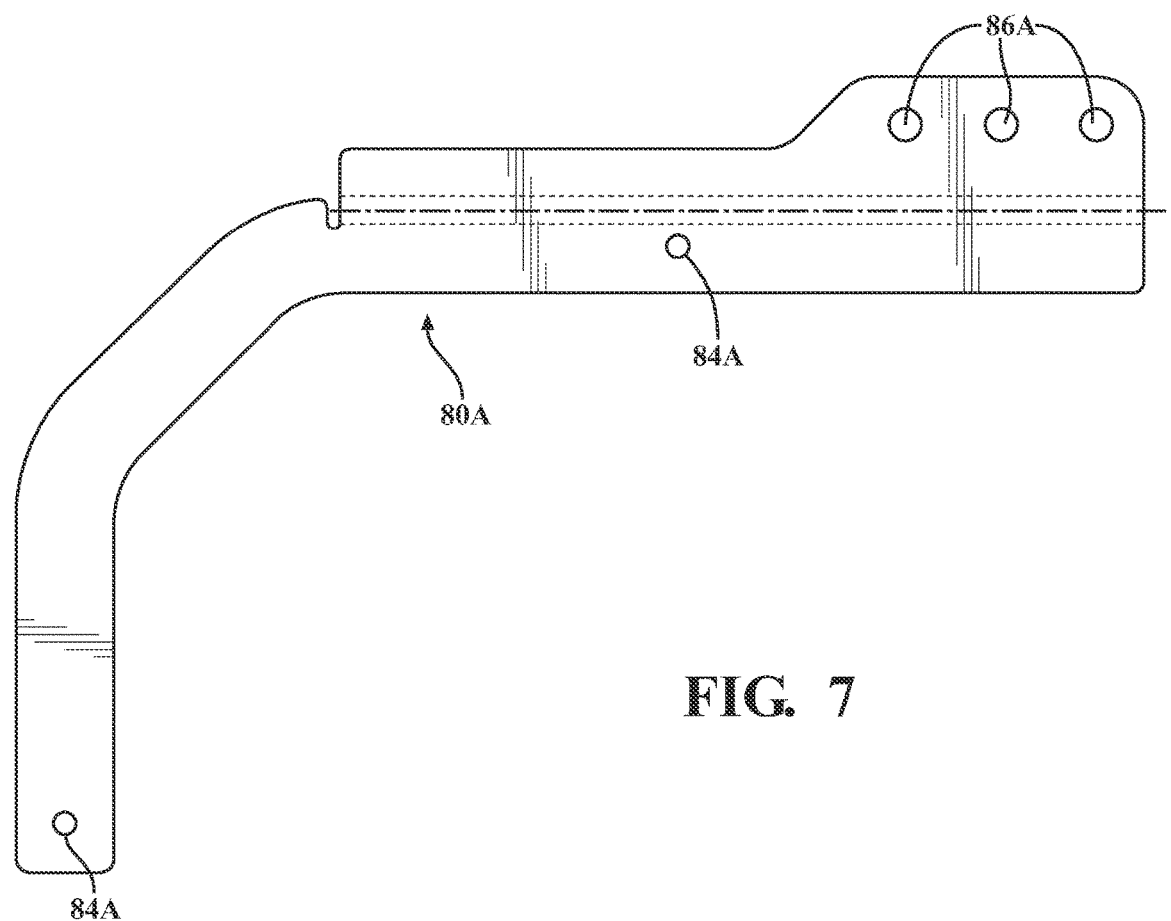
FIG. 7 is a flat view of a door bracket of the door travel control system prior to bending to final shape according to another embodiment such as for a rear door.

In one embodiment, the door bracket 80 may be manufactured of a shape to locate the mount apertures 84 to correspond with the preexisting inner door panel clip apertures 110A, 110B along the upper surface 60 of the door assembly 50. A first linear configuration may be provided for a front passenger door (FIG. 5). Other door brackets 80A (FIG. 7), such as for a rear passenger door, may be of a different configuration to position the mount apertures 84A to use at least two preexisting inner door panel clip apertures as well as position the multiple ball stud mount apertures 86A along the upper surface 60 of the door assembly 50. The door brackets 80, 80A may be, for example, manufactured of a flat steel, stainless steel, flat aluminum sheet, or other materials (shown in FIG. 5) that is then bent to form an "L" shaped component (shown in FIG. 4) in which the multiple ball stud mount apertures 86, 86A are located perpendicular to the mount apertures 84, 84A. The door brackets 80, 80A may be powder coated, anodized, painted, or otherwise treated to resist the elements.

Figure 8:
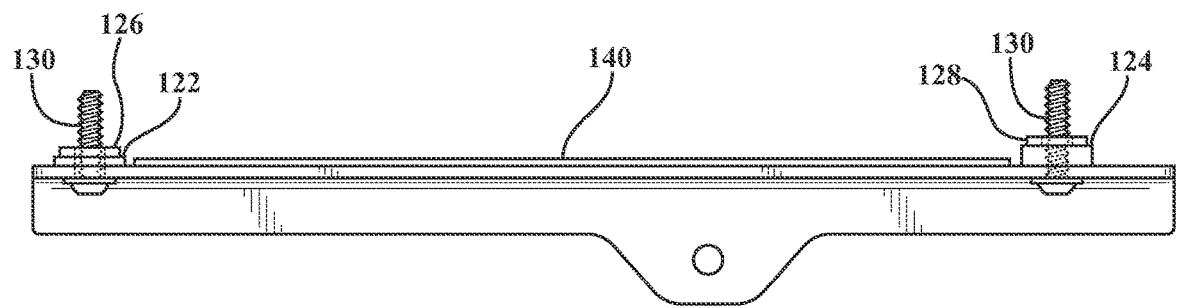
FIG. 8 is a bottom view of the door bracket of the door travel control system illustrating a spacer and adhesive arrangement.

The first spacer 122 and the second spacer 124 may be mounted between the door bracket 80 and the spacers 126, 128. The first spacer 122 may be of a thickness different than the second spacer 124 to position the door bracket 80 with respect to the internal metal door frame 114 (FIG. 8) and to bridge the inner door panel 112 which is typically manufactured of a flexible plastic. Other spacers and or washers may also be provided. The first spacer 122 and the second spacer 124 provides a solid backing for the bracket 80 to tighten against so as to avoid damage to the inner door panel 112. The first spacer 122 and the second spacer 124 also prevents loosening of the fasteners 130 by providing support for the inner door panel 112.

An adhesive 140 (FIG. 8) such as a double-sided tape may also be located between the door bracket 80 and the inner door panel 112 to provide a further interface that reduces squeaking, etc.

Figure 9:
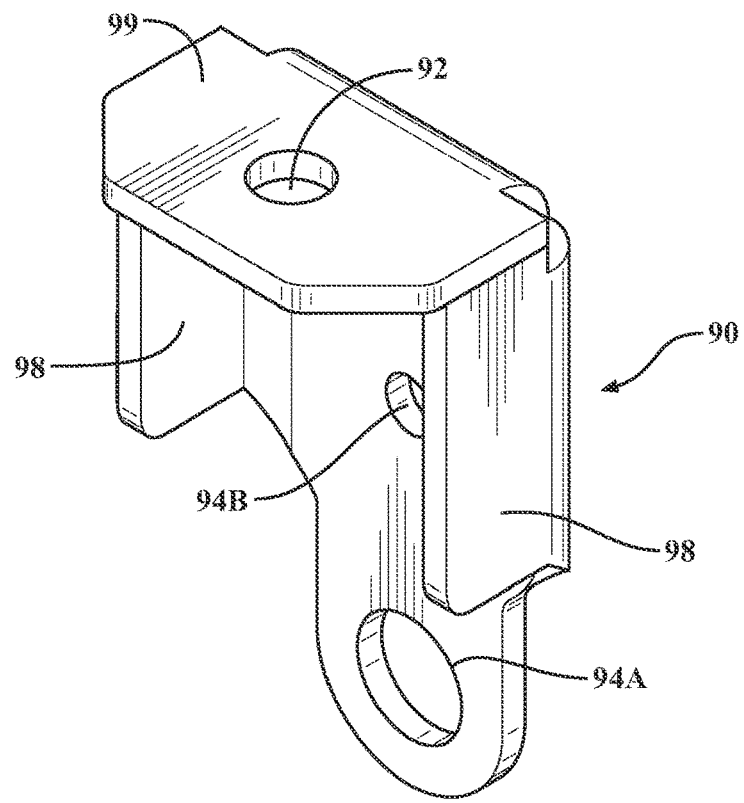
FIG. 9 is a perspective view of a B-pillar bracket of the door travel control system according to one embodiment.
Figure 10:
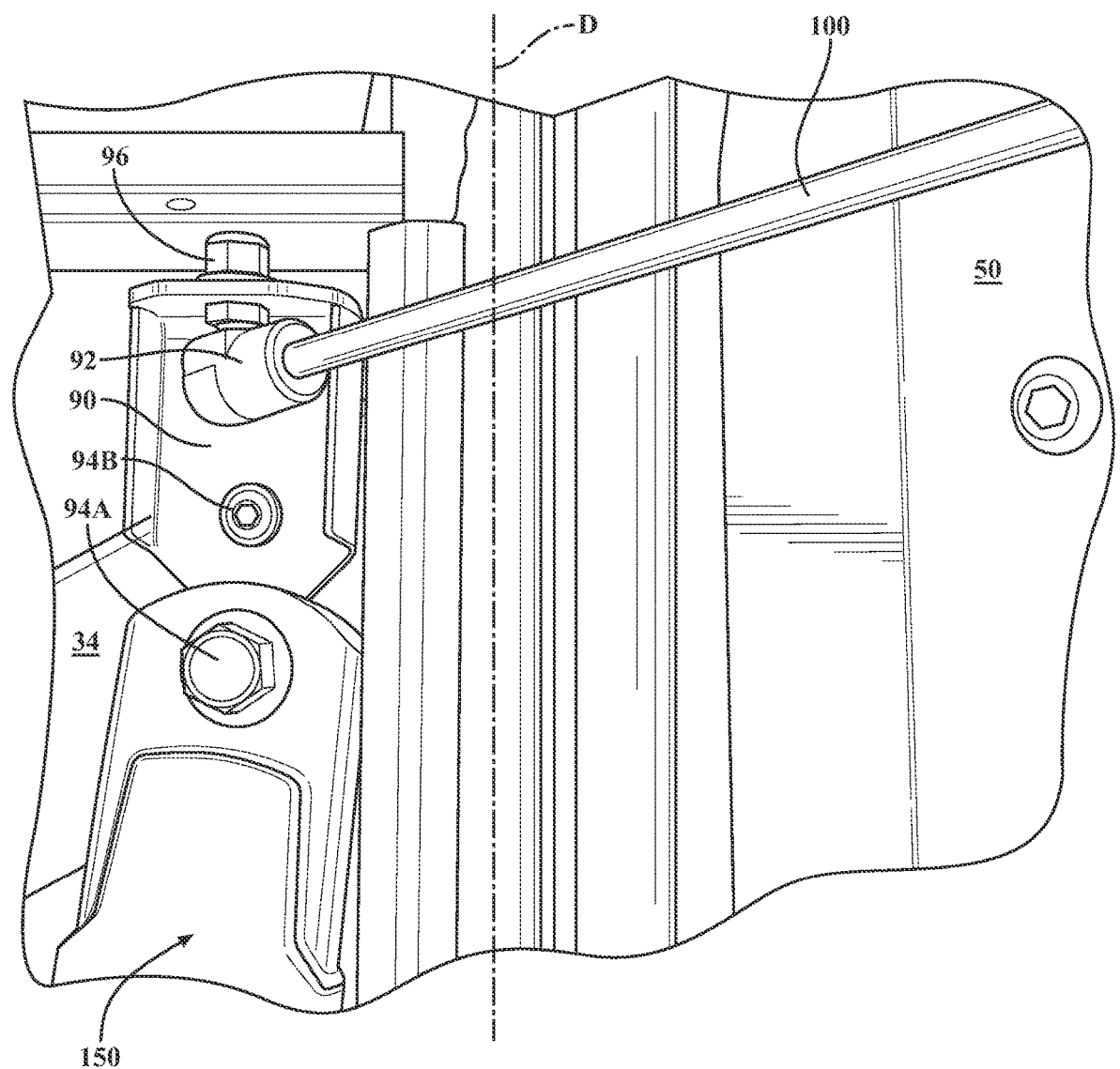
FIG. 10 is a perspective view of a B-pillar bracket of the door travel control system mounted to a B-pillar of the vehicle.

The B-pillar bracket 90 (also shown in FIG. 9) in one embodiment, may be mountable to the B-pillar structure 34 adjacent a seat belt structure 150 (FIG. 10). The B-pillar bracket 90 may include one or more mount apertures 94A, 94B and a ball stud mount aperture 96. The mount aperture 94A may be a primary aperture for the seat belt structure 150 mount to the B-pillar structure 34, and the mount aperture 94B may be a secondary mount for the seat belt structure 150 to the B-pillar structure 34. It should be appreciated that the B-pillar bracket 90 may be of various configurations to correspond with the B-pillar structure 34.

Figure 11:
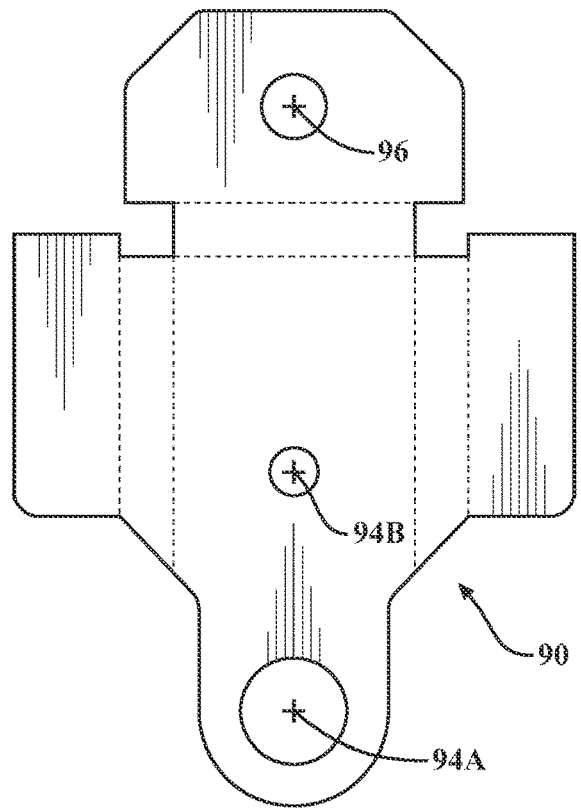
FIG. 11 is a flat view of a B-pillar bracket of the door travel control system prior to bending to final shape according to one embodiment.

The B-pillar bracket 90 may be manufactured of a flat steel, stainless steel, aluminum plate, or other non-metallic materials (FIG. 11) that is then bent to form a partial "U" shaped component in which the ball stud mount aperture 96 is positioned perpendicular to the mount apertures 94A, 94B and the B-pillar bracket 90 is retained in conjunction with the seat belt structure 150. No apertures need be drilled which readily facilitates a simple convenient installation using preexisting mounts for the seat belt structure 150.

Vertical gussets 98 on the B-pillar bracket 90 prevent bending or twisting as well as support a horizontal tab 99 where the ball stud 92 is mounted. Mounted using unmodified existing holes on the vehicle. The shoulder mount of the seat belt structure 150 may be mounted with a shoulder bolt through the mount aperture 94A. The original shoulder bolt may be reused. The mount aperture 94B allows the shoulder portion of the bolt to pass through the B-pillar bracket 90 and be seated in the original position to prevent rotation of the B-pillar bracket 90 and allows the nut to be torqued to manufacturer specifications which avoids any changes to the seatbelt hardware. The B-pillar bracket 90 allows clearance for the shoulder mount of the seat belt structure 150 as original.

The door bracket ball stud 82 and the B-pillar ball stud 92, in one embodiment, may be directed downward with respect to the upper surface 60 of the door assembly 50. In one embodiment, the B-pillar ball stud 92 is lower than the door bracket ball stud 82 with respect to the upper surface 60 allowing for the pneumatic strut 100 to be positioned at a slight downward angle to facilitate proper lubrication of the rod of the pneumatic strut 100 when compressed and opened per manufacturer recommendations. The arrangement avoids obstruction of the field of view of the passengers and provides clearance for the passenger's head when entering and exiting the vehicle. The position of the door bracket ball stud 82 and the B-pillar ball stud 92 further allows for clearance of the electrical wires mounted between the B-pillar and C-pillar structure and between the vehicle and the upper door frame on vehicles equipped with doors with power windows.

Figure 12:
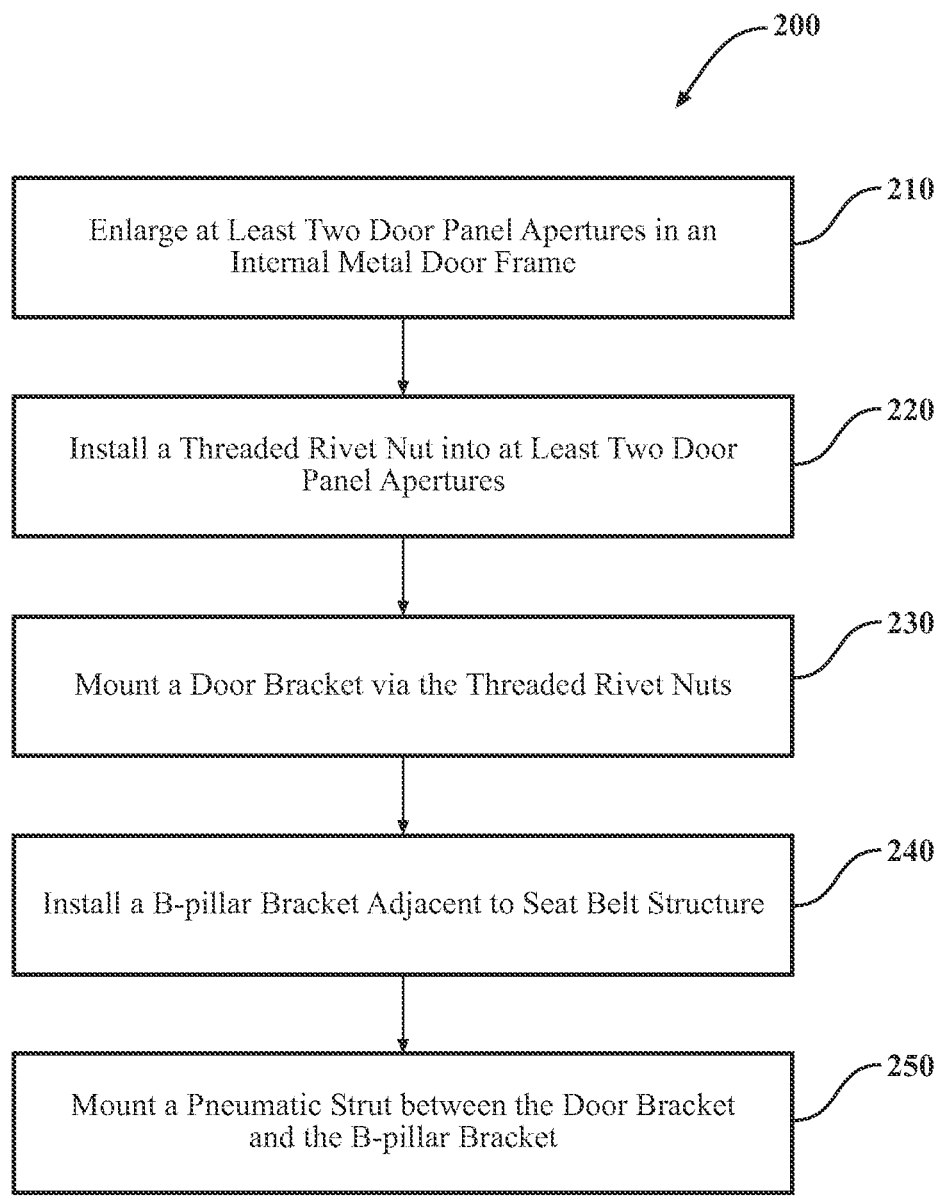
FIG. 12 is a flowchart of a method to install the door travel control system.

With reference to FIG. 12, a method 200 to install the door travel control system 70 is illustrated in a box diagram format. Although other steps may be alternatively or additionally provided, particular steps of the method 200 to effectuate installation of the door travel control system 70 are illustrated in the disclosed embodiment. The method 200 initially includes disassembling the door assembly 50 to access the internal metal door frame 114.

Next, at least two door panel clip apertures in the internal metal door frame 114 are enlarged (step 210). Next, a threaded rivet nut 120 is installed into each of the at least two door panel clip apertures 84 (step 220). The door assembly 50 may be then reassembled. Next, the door bracket is mounted to the passenger door assembly 50 via the threaded rivet nuts 120 (step 230). One or more spacers 122, 124, washers, and or adhesives 140 may be utilized as well.

Next, the B-pillar bracket 90 is mounted adjacent to the seat belt structure 150. (step 240). Various fasteners may be utilized to avoid interference with the seat belt structure 150 as installed by the manufacturer.

The pneumatic strut 100 is then mounted between the door bracket 80 and the B-pillar bracket 90 (step 250). The pneumatic strut 100 may be mounted to the door bracket ball stud 82 mounted to the door bracket 80, and the B-pillar ball stud 92 mounted to the B-pillar bracket 90.

The door travel control system 70 provides resistance to the door closing unintentionally but allows that resistance to be overcome by the operator when closing the door. When in the open position, the door travel control system 70 retains the door at an angle such that the inner door handle is within reach of the operator when sitting in the vehicle.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. A utility vehicle door travel control system, comprising:
   a door bracket mountable adjacent to an upper surface of a passenger door;
   a door bracket ball stud mounted to the door bracket;
   a B-pillar bracket mountable to a B-pillar;
   a B-pillar ball stud mounted to the B-pillar bracket; and
   a strut mounted to the door bracket ball stud and the B-pillar ball stud.

2. The utility vehicle door travel control system as recited in claim 1, wherein the door bracket is mountable via two inner door panel clip apertures.

3. The utility vehicle door travel control system as recited in claim 2, further comprising an adhesive between the door bracket and an inner door panel.

4. The utility vehicle door travel control system as recited in claim 3, further comprising a first spacer and a second spacer adjacent to the door bracket, the first spacer of a thickness different than the second spacer.

5. The utility vehicle door travel control system as recited in claim 1, wherein the B-pillar bracket is mountable to the B-pillar adjacent a seat belt mount.

6. The utility vehicle door travel control system as recited in claim 1, wherein the passenger door is hinged along an aft surface.

7. The utility vehicle door travel control system as recited in claim 1, wherein the door bracket ball stud is directed downward with respect to the upper surface.

8. The utility vehicle door travel control system as recited in claim 7, wherein the B-pillar ball stud is directed downward with respect to the upper surface.

9. The utility vehicle door travel control system as recited in claim 1, wherein the B-pillar ball stud is lower than the door bracket ball stud with respect to the upper surface.

10. The utility vehicle door travel control system as recited in claim 8, wherein the door bracket is mountable via two inner door panel clip apertures.

11. The utility vehicle door travel control system as recited in claim 10, further comprising a first spacer and a second spacer adjacent to the door bracket, the first spacer of a thickness different than the second spacer.

12. The utility vehicle door travel control system as recited in claim 11, further comprising an adhesive between the door bracket and the inner door panel.

13. The utility vehicle door travel control system as recited in claim 12, wherein the B-pillar ball stud is lower than the door bracket ball stud with respect to the upper surface.

14. A utility vehicle enclosure comprising:
    a B-pillar;
    a passenger door hinged along an aft surface of the passenger door; and
    a utility vehicle door travel control system mounted between the passenger door and the B-pillar, wherein the utility vehicle door travel control system is mounted adjacent to an upper surface of the passenger door.

15. The utility vehicle door travel control system as recited in claim 14, wherein the utility vehicle door travel control system is mounted to the B-pillar adjacent to a seat belt mount.

16. A method to install a utility vehicle door travel control system to a passenger door of a utility vehicle, comprising:
    installing a threaded rivet nut into each of at least two door panel clip apertures; and
    mounting a door bracket of the utility vehicle door travel control system via the threaded rivet nuts;
    installing a B-pillar bracket of the utility vehicle door travel control system adjacent to a seat belt stricture; and
    mounting a pneumatic strut between the door bracket and the B-pillar bracket.

17. The method as recited in claim 16, further comprising: enlarging the at least two door panel clip apertures in an internal metal door frame prior to installing the threaded rivet nuts.

\* \* \* \* \*